United States Patent [19]

Gloyna et al.

[11] Patent Number: 5,358,646
[45] Date of Patent: Oct. 25, 1994

[54] METHOD AND APPARATUS FOR MULTIPLE-STAGE AND RECYCLE WET OXIDATION

[75] Inventors: Earnest F. Gloyna; Lixiong Li; Roy N. McBrayer, all of Austin, Tex.

[73] Assignee: Board of Regents, The University of Texas System, Austin, Tex.

[21] Appl. No.: 3,240

[22] Filed: Jan. 11, 1993

[51] Int. Cl.⁵ .............................................. C02F 1/72
[52] U.S. Cl. .................................... 210/762; 210/761; 210/205; 422/190; 422/191; 422/193; 422/197
[58] Field of Search .................. 210/761, 762, 205; 422/190, 191, 192, 193, 196, 197, 234

[56] References Cited

U.S. PATENT DOCUMENTS

| | | |
|---|---|---|
| 2,944,396 | 7/1960 | Barton et al. . |
| 3,449,247 | 6/1969 | Bauer . |
| 3,464,885 | 9/1969 | Land et al. . |
| 3,609,999 | 9/1971 | Lawless . |
| 3,853,759 | 12/1974 | Titmas . |
| 3,900,300 | 8/1975 | Lehman . |
| 3,938,972 | 2/1976 | Sugimura . |
| 4,217,218 | 8/1980 | Bauer . |
| 4,221,577 | 9/1980 | Lowrie . |
| 4,272,383 | 6/1981 | McGrew . |
| 4,292,953 | 10/1981 | Dickinson . |
| 4,338,199 | 6/1982 | Modell . |
| 4,377,066 | 3/1983 | Dickinson . |
| 4,380,960 | 4/1983 | Dickinson . |
| 4,543,190 | 9/1985 | Modell . |
| 4,564,458 | 1/1986 | Burleson . |
| 4,593,202 | 6/1986 | Dickinson . |
| 4,594,164 | 6/1986 | Titmas . |
| 4,668,256 | 5/1987 | Billet et al. . |
| 4,698,157 | 10/1987 | Gillot . |
| 4,714,032 | 12/1987 | Dickinson ........................ 110/347 |
| 4,721,575 | 1/1988 | Binning et al. ................. 210/761 |
| 4,733,852 | 3/1988 | Glasgow et al. . |
| 4,792,408 | 12/1988 | Titmas . |
| 4,793,153 | 12/1988 | Hembree et al. . |
| 4,822,394 | 4/1989 | Zeigler et al. ..................... 62/17 |
| 4,822,497 | 4/1989 | Hong et al. . |
| 4,861,497 | 8/1989 | Welch et al. . |
| 4,872,890 | 10/1989 | Lamprecht . |
| 4,880,440 | 11/1989 | Perrin . |
| 4,891,139 | 1/1990 | Zeigler et al. .................... 210/747 |
| 4,898,107 | 1/1990 | Dickinson ........................ 110/346 |
| 4,936,990 | 6/1990 | Brunsell et al. . |
| 4,968,328 | 11/1990 | Duke . |
| 4,983,296 | 1/1991 | McMahon et al. ............... 210/603 |
| 5,009,857 | 4/1991 | Haerle . |
| 5,011,614 | 4/1991 | Gresser et al. .................. 210/761 |
| 5,053,142 | 10/1991 | Sorenson et al. ................ 210/742 |
| 5,057,220 | 10/1991 | Harada et al. ................... 210/762 |
| 5,057,231 | 10/1991 | Mueller et al. .................. 210/761 |
| 5,075,017 | 12/1991 | Hossain et al. .................. 210/761 |
| 5,106,513 | 4/1992 | Hong ................................ 210/759 |
| 5,133,877 | 7/1992 | Rofer et al. ...................... 210/761 |
| 5,183,577 | 2/1993 | Lehmann ......................... 210/761 |
| 5,192,453 | 3/1993 | Keckler et al. .................. 210/761 |
| 5,221,486 | 6/1993 | Fassbender ..................... 210/757 |
| 5,232,604 | 8/1993 | Swallow et al. ................. 210/759 |
| 5,232,605 | 8/1993 | Baur et al. ....................... 210/761 |
| 5,240,619 | 8/1993 | Copa et al. ...................... 210/761 |
| 5,250,193 | 10/1993 | Sawicki et al. .................. 210/761 |
| 5,252,224 | 10/1993 | Modell et al. ................... 210/695 |

FOREIGN PATENT DOCUMENTS 53-91093  8/1978  Japan .

OTHER PUBLICATIONS

Teletzke et al., "Components of Sludge and Its Wet Air Oxidation Products," *Journal WPCF*, 39(6):994–1005, 1967.

(List continued on next page.)

Primary Examiner—Neil McCarthy
Attorney, Agent, or Firm—Arnold, White & Durkee

[57] ABSTRACT

An organic or inorganic feed compound can be treated in two or more zones to progressively oxidize the compound. The first zone oxidizes the compound to an intermediate product which includes a first intermediate compound which is intermediate the feed compound and end product. The second zone further oxidizes the intermediate product to an end product or a second intermediate compound which is intermediate the first intermediate compound and an end product. One or both zones may operate catalytically and/or at supercritical conditions for water to oxidize the compounds.

48 Claims, 4 Drawing Sheets

OTHER PUBLICATIONS

Conditt and Sievers, "Microanalysis of Reaction Products in Sealed Tube Wet Air Oxidations by Capillary Gas Chromatography," *Anal. Chem.*, 56:2620–2622, 1984.

McGinnis et al., "Conversion of Biomass into Chemicals with High-Temperature Wet Oxidation," *Ind. Eng. Chem. Prod. Res., Dev.*, 22(4):633–636, 1983.

Chowdhury et al., "Catalytic Wet Oxidation of Strong Waste Waters", AIChE Symp. 151:71 (1975), pp. 46–58.

Freeman, *Innovative Thermal Hazardous Organic Waste Treatment Processes*, Noyes Publications: Park Ridge, N.J. (1985), pp. 12–33.

Gloyna, "Supercritical Water Oxidation—Deep Well Technology for Toxic Wastewaters and Sludges", Technical Report, The University of Texas at Austin, 1989.

Imamura et al., "Wet Oxidation of Acetic Acid Catalyzed by Co-Bi Complex Oxides", *Ind. Eng. Chem. Prod. Res. Dev.*, 21(4), pp. 570–575 (1982).

Lee et al., "Efficiency of Hydrogen Peroxide and Oxygen in Supercritical Water Oxidation of 2,4-Dichlorophenol and Acetic Acid", *The Journal of Supercritical Fluids*, 3 pp. 249–255 (1990).

Lu et al., "Selective Particle Deposition in Crossflow Filtration", *Sep., Sci. and Technol.*, 24(7&8), 517–540 (1989).

Mahlman et al., "Cross-Flow Filtration in Physical Chemical Treatment of Municipal Sewage Effluents", Oak Ridge Natl. Lab. Technical Report, EPA/600-/2-76/025, Feb. 1976.

Modell et al., "Supercritical Water—Testing Reveals New Process Holds Promise", *Solid Wastes Management*, Aug. 1982.

Murkes, "Low-shear and High-shear Cross-flow Filtration", *Filtration and Separation*, 23(6), 364–365 (1986).

Murkes et al., *Crossflow Filtration: Theory and Practice*, John Wiley & Sons: New York, 1988.

Opatken, "Aqueous-Phase Oxidation of Sludge Using the Vertical Reaction Vessel System", EPA/600-/2-87/022, Mar. 1987.

Perona et al., "A Pilot Plant for Sewage Treatment by Cross-Flow Filtration", Oak Ridge Natl. Lab. Technical Report ORNL-TM-4659, Oct. 1974.

Shapira et al., "Removal of Heavy Metals and Suspended Solids from Battery Wastewaters: Application of Hydroperm Cross-flow Microfiltration", Gen. Battery Corp. Report EPA/600/2-81/147, Aug. 1981.

Thomason et al., "Supercritical Water Destruction of Aqueous Wastes", *Hazardous Waste*, 1(4), 453–467 (1984).

Teletzke, "Wet Air Oxidation", *Chem. Eng. Prog.*, 60(1), pp. 33–38, Jan. 1964.

Yang et al., "Homogeneous Catalysis in the Oxidation of p-Chlorophenol in Supercritical Water", *Ind. Eng. Chem. Res.*, 27(1), pp. 2009–2014 (1988).

Zimmermann, "New Waste Disposal Process", *Chem. Eng.*, pp. 117–120, Aug. 1958.

Jacobs et al., "Phase Segregation", *Handbook of Separation Process Technology*, published by John Wiley & Sons (1987).

Stone & Webster Engineering Corp., "Assessment and Development of an Industrial Wet Oxidation System for Burning Waste and Low Grade Fuels", Final Report, Work Performed Under Contract DE-FC07 881D12711, Prepared for U.S. Department of Energy, Sep., 1989.

Todheide et al., "Das Zweiphasengebiet und die kritische Kurve im System Kohlendioxid—Wasser bis zu Drucken von 3500 bar," *Zeitschrift fur Physikalische Chemie Neue Folge*, Bd. 37, 8. 387–401 (1963).

Zimmermann et al., "The Zimmermann Process and Its Applications in the Pulp and Paper Industry", TAPPI, 43(8), pp. 710–715 (1960).

PCT Search Report mailed Dec. 3, 1992.

Keng-Chen Chang et al., "Supercritical water oxidation of acetic acid by potassium permanganate", *J. of Hazardous Materials*, vol. 32, pp. 001–012 (1992).

Yoshiaki Harda, "Wet Catalytic Oxidation Process for Wastewater Treatment", *Abstract* (1991).

Sellchiro Imamura et al., "Wet Oxidation of Ammonia Catalyzed by Cerium-Based Composite Oxides", *Ind. Eng. Chem. Prod. Res. Dev.*, vol. 24, No. 1, pp. 75–80 (1985).

Lei Jin et al., "The Effect of Supercritical Water on the Catalytic Oxidation of 1-4-Dichlorobenzene", presented at AIChE Spring Meeting, Orlando, Fla., Mar. 19–23 (1990), *Abstract*.

Dong-Soo Lee et al., "Efficiency of $H_2O_2$ in Supercritical Water Oxidation of 2,4-Dichlorophenol and Acetic Acid", presented at AIChE Spring Meeting, Orlando, Fla., Mar. 19–23 (1990), *Abstract*.

METHOD AND APPARATUS FOR MULTIPLE-STAGE AND RECYCLE WET OXIDATION

BACKGROUND OF THE INVENTION

1. Field of the Invention

The present invention generally relates to the treatment of industrial and municipal waste waters. The invention more particularly concerns a multiple-stage supercritical and catalyzed wet oxidation system aimed at providing a more rapid and complete degradation of organic and inorganic compounds in industrial and municipal waste waters.

2. Description of the Prior Art wet oxidation of waste water and sludge has been used since the 1960s. These waste streams may vary widely in composition. For example, municipal waste water typically contains relatively large amounts of organic matter and small amounts of minerals. Industrial waste streams or sludges may contain organic matter which is unlike the organic matter contained in municipal waste, in addition to relatively larger amounts of mineral matter.

One commercial application of wet oxidation is a wet oxidation process conducted at subcritical conditions for water. This process, however, only partially degrades the waste materials and produces relatively large amounts of low molecular weight organic compounds. To achieve more complete and effective destruction of hazardous waste materials, recent investigations of wet oxidation have been directed at above the critical point of water, or at the use of catalysts.

Supercritical water oxidation has been demonstrated in some lab-scale tests to be more effective than subcritical wet oxidation. Catalysis studies have also shown that many metals, metal oxides, or metal ions actively take part in subcritical wet oxidation processes. One subcritical wet oxidation process has employed water soluble copper and silver ions as catalysts, in concentrations between 10 ppm and 10,000 ppm.

Another known process suggests a flow sequence which includes (1) pressurization of a feedstock, (2) injection of compressed oxygen gas into the feedstock, (3) heating the feedstock by heat exchange with the hot reactor effluent, (4) control of reaction temperature using a heater, and (5) catalytic oxidation of organic compounds in a single reactor.

Hydrogen peroxide has been used as a catalyst for wet oxidation of phenol in subcritical water. Hydrogen peroxide (ag.) or ozone (ag.) have also been used as a sole source of oxidant in supercritical water oxidation.

Transition element catalysts have been used in catalytic processes for degradation of organic materials in aqueous and organic fluids in efforts to produce environmentally compatible products.

Several methods have also been used or proposed for removing residue solids from a reactor in wet oxidation processes. One known practice involves shutting down the wet oxidation system, completely draining the reactor, and then physically removing the solids. Other methods suggest periodic removal of solids from a wet oxidation reactor, with only a temporary suspension of feed to the plant, without draining the entire liquid portion of the reactor contents, and without cooling the reactor contents.

Still another method suggests a two zone pressure vessel in which precipitates and other solids fall or are sprayed from a supercritical temperature upper zone into a lower temperature lower zone. The feed material may include various waste products which are substantially oxidized in the upper zone of the pressure vessel. A brine or slurry which forms at the lower temperature sub zone of the vessel is removed via a pipe and disposed of.

While the systems of the prior art have proved able to attack the waste materials in waste waters and sludges, further improvements are needed for better efficiency and effectiveness. As noted, for example, the existing systems tend to produce products which can be toxic and undesirable in themselves. The catalytic systems are subject to poisoning, and the catalysts, therefore, tend to require frequent regeneration or replacement with attendant high down time and operating costs.

SUMMARY OF THE INVENTION

The present invention addresses the problems associated with existing systems of treating industrial and municipal waste and related waste streams by the use of multiple-stage reactors. A waste stream which is preferably aqueous is passed through a first reactor, zone, or stage where it is typically oxidized to form relatively stable, light and/or low molecular weight volatile components and heavier or higher molecular weight solid components. The solid components are preferably separated from the first zone. The volatile components pass to the second stage or zone where they are further oxidized to form simple end products such as carbon dioxide, nitrogen, inorganic acid roots, water and the like.

The first stage is preferably a thermal wet oxidation stage, wherein the waste feed stream is oxidized with an oxygen-containing fluid at supercritical conditions for water and in the absence of a catalyst. The organic components oxidize to form oxides of carbon, nitrogen, water, and/or relatively low molecular weight compounds such as volatile acids, aldehydes, ammonia, alcohols, and the like. Minerals or inorganic components oxidize to typically form oxides of metals such as iron, and oxides of acidic elements such as sulfur, nitrogen, and phosphorous, etc. The metallic oxides may, in turn, react with the acidic oxides to form salts and the like. In general, the mineral components tend to form solid particles, while the organic components tend to form liquids and gases. The solid particles are preferably separated from the liquids and gases as these products exit the thermal stage, and preferably only the gases and vapors pass to the catalytic stage. Removal of the solid particles thus helps to protect the catalyst in the catalytic stage from being poisoned. Meanwhile, the product gases and vapors from the thermal stage are converted to end products such as carbon dioxide and water in the catalytic stage. The catalyst may be selected from a variety of oxidation catalysts which typically comprise noble metals such as platinum, transition metal oxides or composite oxides, and other hydrocarbon oxidation catalysts. In general, the operating conditions in the catalytic stage may be supercritical conditions for water, although the conditions may vary depending largely upon the choice of catalysts.

Although the invention preferably employs a thermal stage followed by a catalytic stage, it is contemplated that other combinations of stages may be preferred for particular types of waste streams. Thus, where catalyst poisoning is especially troublesome, a plurality of multiple thermal stages may be employed. Alternatively, a plurality of catalytic stages may be employed, if necessary. In all instances, however, two stages or more are preferred. In the first stage, complex organic components are preferably converted to lower molecular weight intermediate products, and metal components are converted to metallic oxides and salts. In the second stage, the intermediate products are further converted largely to oxides of carbon and water; the metallic oxides, salts and the like are preferably removed prior to the second stage.

In both the thermal and catalytic stages of the invention, it is preferred that the operating conditions involve wet oxidation under supercritical conditions for water in at least one of the stages and preferably both stages. Thus, in a general aspect, the invention provides a system for improving the wet oxidation of a feed stream by the use of multiple-stage reactor. The feed stream undergoes preliminary conversion in at least one catalytic or noncatalytic reactor(s) to form end products and/or intermediate products. The intermediate products preferably include first intermediate compounds intermediate the feed compounds and the end products. The intermediate products may then be reacted in at least one catalytic or noncatalytic reactor(s) to form end products, or second intermediate compounds. The second intermediate compounds are preferably intermediates of the first intermediate compounds and the end products. If the first reaction is catalytic, the second reaction may be noncatalytic, and vice versa.

The reactor of the invention preferably includes a separator prior to the second stage to separate solids from vapors and gases. The reactor also preferably includes an oxidant source to add oxidant in or before each thermal stage and catalytic stage. The reactor may further include recycle conduits to recycle fluid from one or more stages to one or more preceding stages. Heat exchangers may also be employed whereby a hot products stream from any given stage may be employed to heat a feed stream to that same stage or a preceding stage.

In one embodiment of the invention, an apparatus for treating waste water may include: (1) a reactor vessel having a central flow chamber and at least one annular flow chamber in coaxial heat exchange relation, wherein at least the central flow chamber is operable at supercritical conditions for water during use; (2) a fluid passageway interconnecting at least one annular flow chamber and the central flow chamber for flow of fluid between the central flow chamber and at least one such annular flow chamber during use; and (3) a catalyst in at least one annular flow chamber. The annular flow chambers may be operable during use at supercritical conditions for water.

In another embodiment of the invention, the apparatus of the invention may include: (1) a reactor vessel having a central flow chamber and at least one annular flow chamber in coaxial heat exchange relation, wherein at least one such annular flow chamber is operable at supercritical conditions for water during use; (2) a fluid passageway interconnecting at least one of the annular flow chambers and the central flow chamber for flow of fluid between the central flow chamber and at least one such annular flow chamber during use; and (3) a catalyst in the central flow chamber. In each of the above embodiments, fluid may flow from one or more annular flow chambers to one or more central flow chambers, and vice versa.

In accordance with one method embodiment of the invention, a feed waste stream may be treated by: (1) thermally reacting a compound in the feed stream at supercritical conditions for water to form end products, and/or intermediate products which include first intermediate compounds; and (2) catalytically reacting the intermediate products stream to form an end product, or second intermediate compounds. This method embodiment will normally include the step of adding an oxidant to the feed stream during or before the catalytic reaction. The method will preferably include the step of separating any solids from fluids in the intermediate products stream or in the end product. The method may also include the step of recycling a portion of the intermediate products stream or end products to the feed stream. The method may further include the step of exchanging heat between the feed stream, and the intermediate products stream or the end product stream. The method may also include the step of exchanging heat between the feed stream or the intermediate products streams, and the end product stream. The method may also be modified such that the intermediate product is catalytically reacted at supercritical conditions for water.

An alternate method embodiment of the invention includes the steps of: (1) catalytically reacting a feed compound in a feed stream to form an intermediate products; and (2) thermally reacting the intermediate products at supercritical conditions for water to form an end product. This method may include additional oxidizing, recycling, heat exchange, and separation steps such as described above. This method may also be modified such that the intermediate product is catalytically reacted at supercritical conditions for water.

An advantage of the invention described herein is that it provides an improved wet oxidation process in which catalysts and flow schemes are employed to promote degradation reactions, reduce reaction times and/or temperatures, increase the completeness of oxidation, increase process control by in situ solids separation, and optimize heat utilization. Another advantage of the invention is that it provides for better oxidant mixing and control. Still another advantage of the invention is that it provides for in situ separation of residue solids within the reactor vessel and for improving solids separation efficiency by controlled recycling of the treated effluent.

DETAILED DESCRIPTION OF THE PREFERRED EMBODIMENTS

Figure 1:
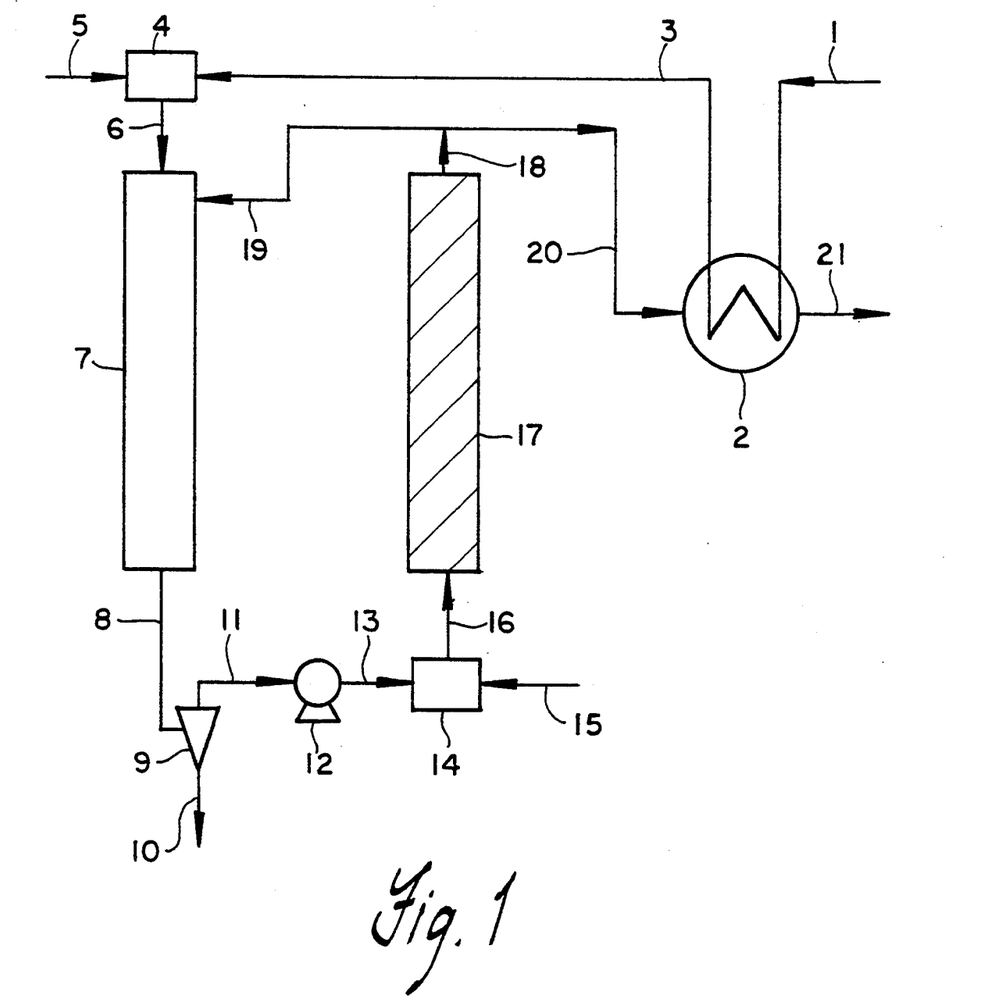
FIG. 1 shows a preferred embodiment for a two-stage, recycled wet oxidation process.

With reference to FIG. 1, a process flow for one embodiment of the invention is described as follows. A "cold" (i.e., at or less than about ambient temperatures) and untreated pressurized feed stream is preferably introduced from line 1 to one or more heat exchanger(s) 2. The emerging feed stream 3 is then sent to an oxidant source or mixer 4 into which a pressurized oxidant 5 (e.g., oxygen, hydrogen peroxide, or air) may be added.

The fluid mixture 6 may then be directed into a first stage, substantially thermal, noncatalytic reactor 7. The terms "stage," "reactor," and "zone" are used somewhat interchangeably to mean stages or zones in a reactor, or to mean individual reactors as shown in FIG. 1. Upon entering the thermal reactor 7, the fluid 6 is preferably near or above supercritical conditions for water (i.e., about or above 705° F. (374° C.) and about or above 3205 psia (221 bar)). The terms "substantially noncatalytic" and "thermal," as used herein, mean that the reactor is constructed without addition of catalysts that would substantially affect the supercritical reaction.

As the mixture 6 flows in reactor 7, relatively easily oxidizable compound(s) may be converted to intermediate products that include either complete oxidation end products (e.g., carbon dioxide or water) or first intermediate compounds (e.g., nitrous oxides, ammonia, alcohols or acetic acid) that are intermediates of the end products and the feed compounds. The term "intermediate" in this context refers to molecular weight, activation energy, stability, and/or oxidation state. As such, the intermediate compound typically has a molecular weight, activation energy, stability and/or oxidation state which is between the values of the feed compound and the end product. The end products typically have lower molecular weights, higher stability and a higher oxidation states than the feed compounds. For instance, in a preferred embodiment complex organic compounds may be oxidized in the first stage to intermediate compounds such as acetic acid, which are then oxidized in a second stage to end products such as carbon dioxide. Other preferred end products include water and nitrogen.

Solids encountered in a supercritical water oxidation reaction may generally come from three sources: (1) non-oxidizable solid components in the feed; (2) metal oxides converted from feed components or as a result of corrosion; and (3) inorganic salts either present in the feed or generated through oxidation reactions.

While mixture 6 is in reactor 7, residual solids may be formed. Following the first-stage reactor 7, the newly formed mixture 8 may be introduced into a solids separator 9. Solids (e.g., ash) 10 may be continuously or periodically removed from the separator 9. The effluent 11 from separator 9 continues through the system.

If effluent 11 is to be recycled (via line 19) back into thermal reactor 7, a recycling pump 12 is generally needed to compensate for the pressure loss across the reactor 7, solid separator 9, mixer 14, and reactor 17. Preferably the repressurized effluent 13 passes through a mixer 14 where additional oxidant(s) 15 (such as oxygen, air or hydrogen peroxide) may be added.

Complete oxidation of the first intermediate compounds is possible but relatively inefficient in the substantially noncatalytic reactor 7 since the first intermediate compounds tend to be more stable at supercritical conditions than the feed compounds. Thus it may be more efficient (i.e., use less time and/or energy) to react the first intermediate compounds to end products in a second substantially catalytic reactor 17.

As shown in FIG. 1, the mixture 16 is fed into a catalytic reactor 17. "Catalytic reactor," as used herein, means a reactor with at least one catalyst added to substantially promote the desired reaction. The catalytic reactor may include a fixed or fluidized catalyst bed.

In catalytic reactor 17 first intermediate compound(s) may be further oxidized to end products or to second intermediate compounds which are intermediates of the first intermediate compounds and the end products. Preferably, the thermal reactor 7, operating at supercritical conditions for water, is operated so as to reduce the number and complexity of intermediate products.

Since the thermal reactor 7 needs only to oxidize feed components to intermediate products (and not end products), the reactor 7 may operate more efficiently with substantially less residence time, heat, and/or pressure than would be required to oxidize the feed components to end products. The catalytic reactor 17 may also be expected to operate more efficiently since catalysts used in reactor 17 are only required to oxidize a reduced number of more specifically defined intermediate products (as compared to the number of feed compounds). Thus, the catalysts may be better tailored to meet specific chemical needs. For example, many complex organic feed compounds may be oxidized to a smaller number of first intermediate compounds in the thermal reactor. As a result, the substantially catalytic reactor may be tailored to more efficiently react the smaller number of first intermediate compounds. In addition to efficiency advantages, solids and other impurities may be removed before the catalytic reactor 17, thus preventing clogging or poisoning of the catalyst in reactor 17.

Effluent product 18 from the catalytic reactor 17 may be split into two portions. A portion 19 may be recycled into the first reactor 7, and the remainder 20 flows to heat exchanger 2 to heat the feed stream 1. The purpose of recycling a portion of effluent 18 is to (1) utilize the thermal energy accumulated in the effluent 18; and (2) increase the fluid velocity in the thermal reactor 7. After transferring heat to the feed stream 1, the effluent 21 from the heat exchanger 2 is discharged.

In an alternate embodiment the thermal reactor 7 and the catalytic reactor 17 may exchange places in the process flow shown in FIG. 1. Thus, in this embodiment, the catalytic reactor is this "first-stage" reactor 17 and the thermal reactor is the "second-stage" reactor 7. This embodiment is expected to be advantageous in certain applications where it may be desirable to first use a catalytic reactor to react the feed stream into intermediate products, and then react the intermediate products to end products in a thermal reactor.

In still another embodiment, the catalytic reactor 17 described in the above embodiments may be operable at supercritical conditions for water.

In the above embodiments, it will be noted that reactor 7 is shown as a down-flow reactor in which the two input streams and the recycle stream flow in the same direction. Reactor 17, on the other hand, is shown to be an up-flow reactor. In general, both thermal reactors and catalytic reactors may be operated in either mode. If liquids are present in the product stream of a reactor, it may be preferable to employ a down-flow mode. This possibility is greater in the first stage reactor. In a catalytic reactor, an up-flow pattern is generally preferred, especially where the catalyst is present as a fluidized bed.

EXAMPLE 1—RECYCLING MASS RATIO

Recycling the second-stage reactor effluent back to the first-stage reactor may be expected to provide two advantages. First, the fluid velocity in the first-stage reactor and the solid separator may be increased, thus reducing back mixing in the reactor and enhancing solid separation efficiency. Second, the temperature of the stream flowing into this first-stage reactor may be raised by mixing with the hot recycled stream, thus reducing heat exchanger requirements and increasing process heat utilization.

The mass ratio (R) of the recycle stream vs. the feed stream tends to affect reaction temperatures in the reactors. Since water has a relatively large specific heat capacity among the major components involved (such as oxygen and carbon dioxide), it is reasonable to use the properties of water for a first and conservative approximation. In particular, the enthalpy of water (from *NIST Standard Reference Database* 10) used to calculate the temperature of the mixture ($T_M$) at a given recycle mass ratio (R) is $H_M = H_f/(1+R) + H_r R/(1+R)$, where $H_f$ and $H_r$ are enthalpy (at 3500 psi (about 241 bar) of the feed and recycle streams, respectively. The calculated results for a range of the mass recycle ratios are shown in Table 1.

TABLE 1

Mixture Temperature and Mass Ratio Relationship of Two Water Streams at 3500 psi (about 241 bar)

| Mixture Temp. ($T_M$) °F. (°C.) | Mass Ratio (R) lb. Recycled @ 850° F. (454° C.) per lb. Feed @ 70° F. (21° C.) | Mass Ratio (R) lb. Recycled @ 850° F. (454° C.) per lb. Feed @ 500° F. (260° C.) |
|---|---|---|
| 500 (260) | 0.550 | 0 |
| 550 (288) | 0.672 | 0.078 |
| 600 (316) | 0.826 | 0.178 |
| 650 (343) | 1.04 | 0.317 |
| 700 (371) | 1.45 | 0.577 |
| 750 (399) | 6.69 | 3.96 |
| 800 (427) | 18.5 | 11.6 |

EXAMPLE 2—A TWO-STAGE, CATALYZED WET OXIDATION PROCESS

Figure 2:
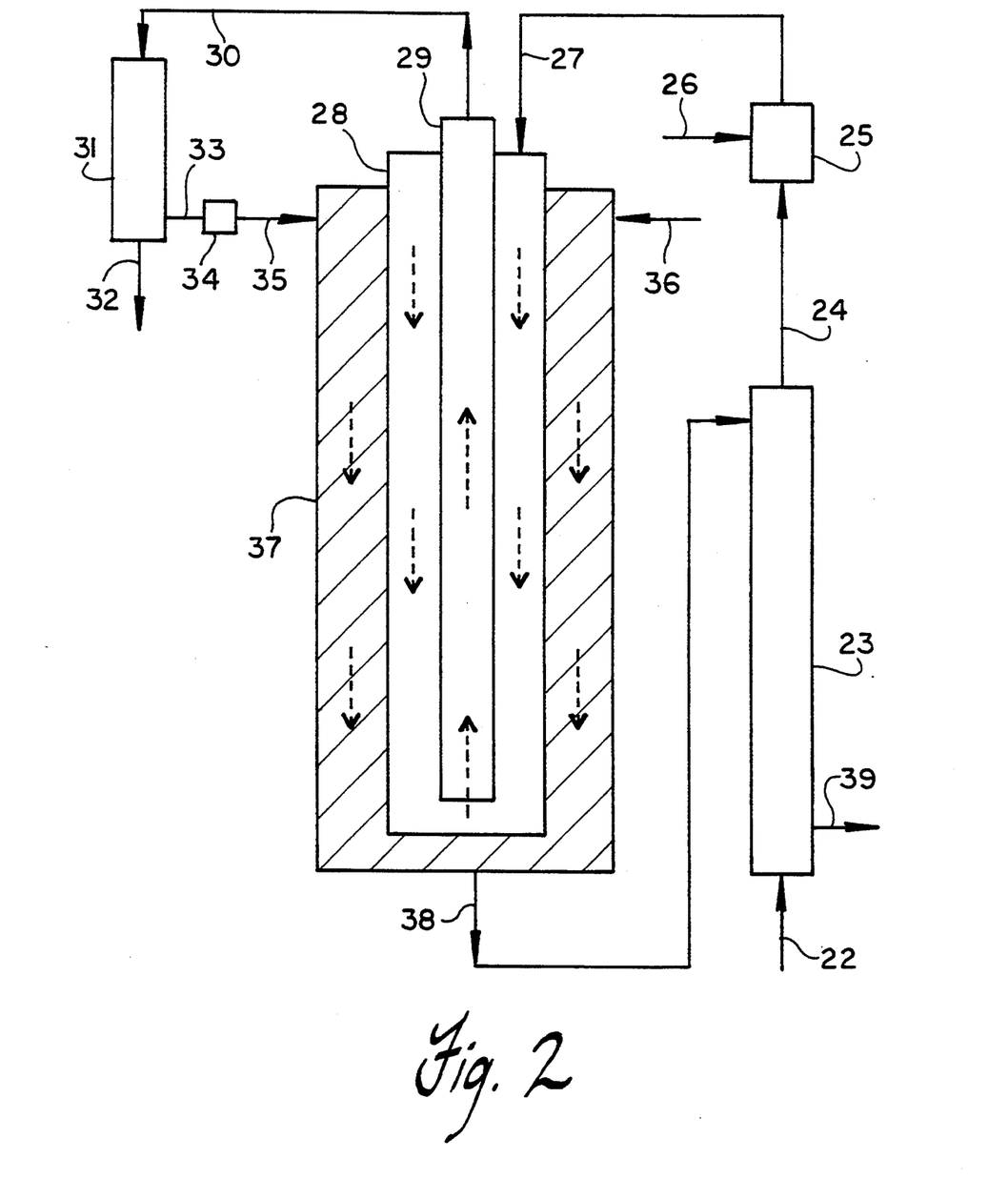
FIG. 2 shows an alternate embodiment of a two-stage wet oxidation process.

An alternate embodiment of the invention includes a two-stage, catalyzed wet oxidation process. This process does not necessarily include a recycle. As depicted in FIG. 2, the first-stage thermal reactor 28 may be positioned within a second-stage catalytic reactor 37. A pressurized feed stream 22 may be fed into one or more heat exchanger(s) 23. The heated feed stream 24 may then be mixed with an oxidant 26 in mixer 25. The oxidant/feed mixture 27 may then enter at least one annular space of the thermal reactor 28. Although not shown in FIG. 2, the reactor 28 may include a plurality of annular spaces.

As shown in FIG. 2, the reaction mixture may be returned through a center tube 29 in thermal reactor 28. The mixture 30 exiting center tube 29 may then be directed to a solids separator 31, and solids 32 discharged from separator 31. The pressure of the filtrate 33 may optionally be reduced by a pressure reduction device 34. The depressurized filtrate 35 may then enter the catalytic reactor 37. Additional oxidant 36 may be added to the catalytic reactor 37. The effluent 38 from the catalytic reactor 37 may be connected to the hot fluid side of the heat exchanger 23. The effluent 38 may then go through the heat exchanger 23 and the cooled effluent 39 discharged.

The thermal and the catalytic reactors may be operated at different conditions. Either one or both may operate at supercritical conditions for water. In addition, the direction of fluid flow through the reactors may be reversed. In an alternate embodiment, the positions of the thermal and the catalytic reactors may be reversed.

Figure 3:
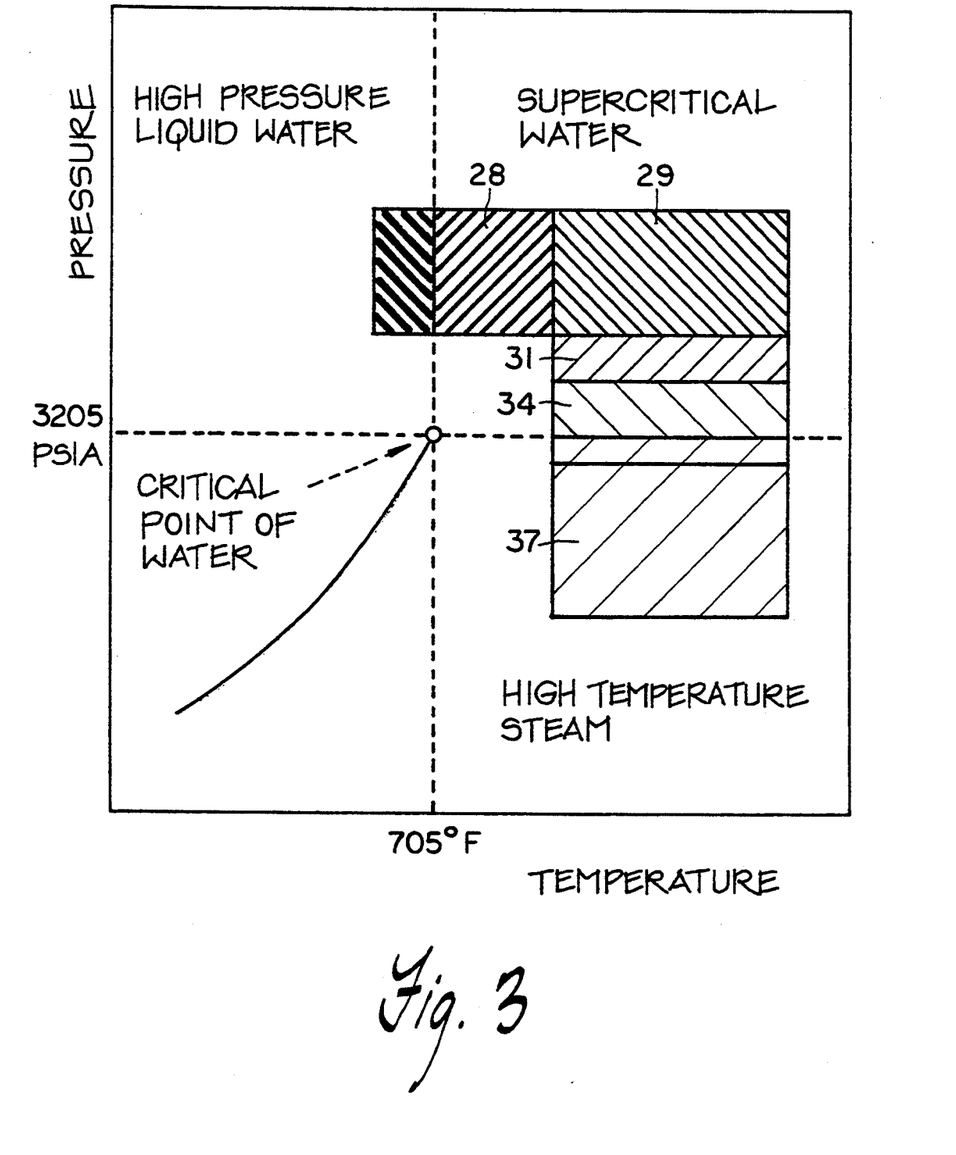
FIG. 3 shows a pressure and temperature relationship for operation of the two-stage wet oxidation process.

The change of fluid conditions in the process of the invention affect the state of the fluid as it moves through various process equipment. The states of the fluid may be illustrated in a pressure vs. temperature diagram as shown in FIG. 3. In FIG. 3, the numbers correspond to the equipment shown in FIG. 2 and explained above. The shaded areas in FIG. 3 represent the fluid state in the equipment. Darker shade intensities in each shaded area indicate greater density of the fluid. The fluid densities range from that of higher pressure and lower temperature water (the darker shaded areas) to lower pressure and higher temperature steam (the lighter shaded areas). As shown, the inlet temperature of the thermal reactor 28 in the annular section may be below or above the critical temperature of water. As the fluid flows through the reactor towards the center tube 29, the temperature rises as a result of dissipation of the reaction heat and heat transferred from the fluid in the core section 37. The pressure drop across the thermal reactor is generally relatively low. More pressure loss occurs when the fluid passes through the solid separator 31 and pressure reduction device 34. The pressure of the fluid in the thermal reactor 37 may be below or above the critical pressure of water, however, preferably the temperature is maintained at or above the supercritical water temperature.

EXAMPLE 3—OXIDATION OF PHENOL, ACETIC ACID, AND WASTE WATER

Figure 4:
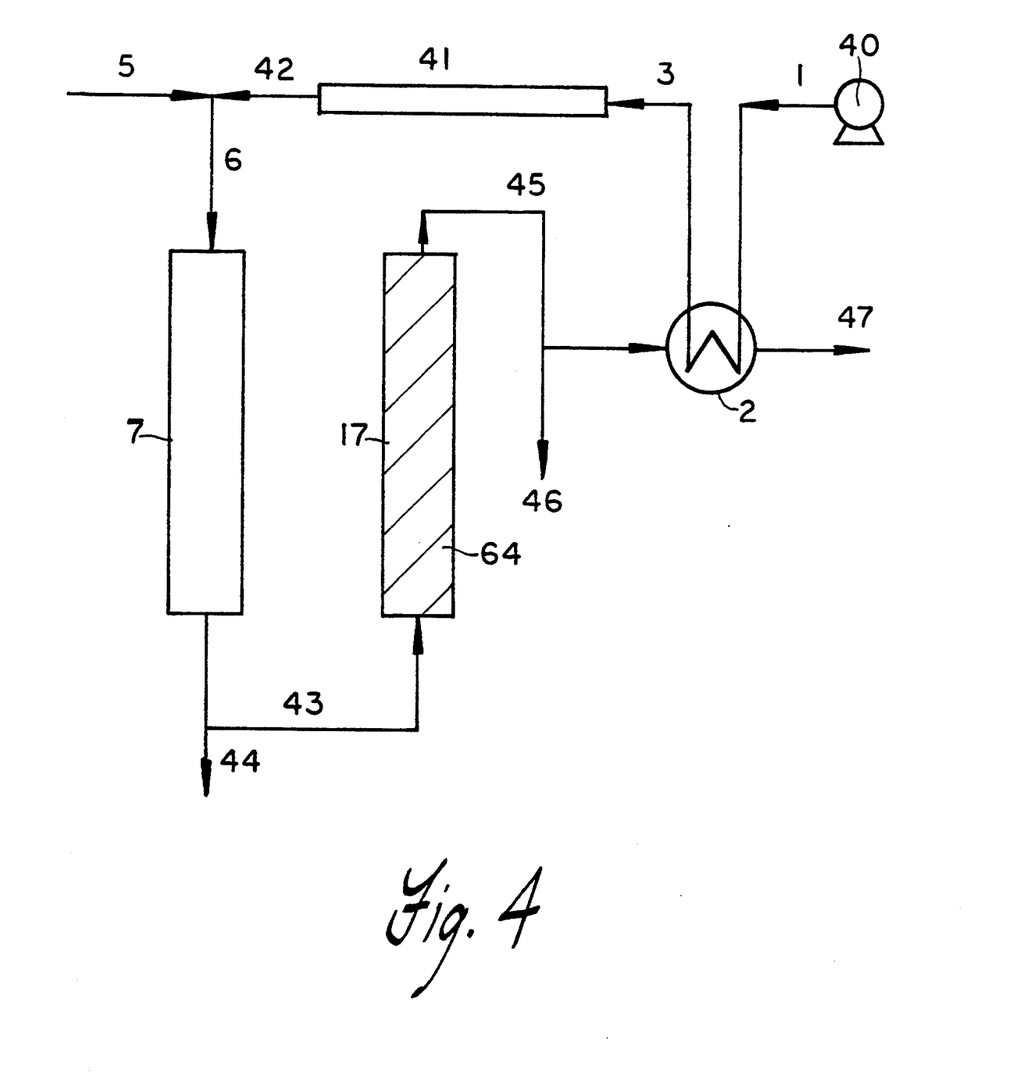
FIG. 4 is a simplified flow diagram of the reactor used in various experiments.

As shown in FIG. 4, a simplified version of the reactor system in FIG. 1 was used to conduct several tests concerning the oxidation of various streams. In FIG. 4 feed pump 40 pressurized stream 1, which then flowed into heat exchanger 2 and became heated stream 3. Stream 3 was heated further in heater 41 to become stream 42. Stream 42 was then mixed with oxygen stream 5 and formed reactor feed stream 6, which was fed into thermal reactor 7. Reactor 7 was a concentric tube substantially noncatalytic thermal reactor which operated at or above supercritical conditions for water. Stream 43 emerged from reactor 7 and a sample stream 44 was taken from it. Stream 43 then flowed into substantially catalytic reactor 17. Reactor 17 was a packed column filled with Cordierite ceramic substrate 64 CPI (i.e., "cells per inch") with a dimension of 1 inch diameter, and filled to 2 inches deep. The catalyst included Mn/Ce oxides (1:1 ratio) and had a washcoat of $ZrO_2$. The washcoat was an exterior coating on the Cordierite substrate onto which the Mn/Ce oxide was coated. It is also possible to use platinum on Cordierite with a washcoat of $ZrO_2$ and Mn/Ce oxide pellets with an alumina binder (Carulite 100). Effluent stream 45 from reactor 17 was sampled via stream 46. Stream 45 was then sent through heat exchanger 2 to heat stream 1 and then become stream 47.

The system shown in FIG. 4 was tested in order to oxidize aqueous phenol, acetic acid, and waste water to end products. The results of these tests are shown in Tables 2-4, respectively. In each test the system operated at 3600 psig, and oxygen was added at the rate of 120% of stoichiometric demand. The temperatures in the first column of each Table were taken at the reactor 7 bottom. In Tables 2-4 reactor residence time was calculated based upon the volumetric flow rate of water and effective reactor volume. Conversion for both the first and second reactors is based upon feed concentrations.

TABLE 2

Feed flow rate = 220 lb/hr. of aqueous solution containing phenol.

| Reactor Temp. (°F.) | Feed Concentration (ppm) | 1st-Stage Reactor (noncatalytic) | | 2nd-Stage Reactor (catalytic) | |
|---|---|---|---|---|---|
| | | Residence Time (sec) | Conversion (%) | Residence Time (sec) | Conversion (%) |
| 830 | 646 | 53.5 | 86.9 | 2.7 | 98.4 |
| 800 | 646 | 60.9 | 78.7 | 3.0 | 98.9 |
| 780 | 646 | 66.4 | 72.0 | 3.3 | 98.5 |

Table 2 shows that phenol is relatively easy to oxidize by exposure to supercritical conditions in the first, thermal reactor. As shown above, conversions ranged from about 72% to about 87% without any catalytic treatment, but reached above 98% when supercritical treatment in the first reactor was followed with catalytic treatment in the second reactor. It is also informative to note that the conversions shown in Table 2 (and Tables 3 and 4—see below) were obtained with residence times in the 2nd-stage reactor being less than about 10% (e.g. about 5%) of the residence times in the 1st-stage reactor. As a result, the total size of the reactor system (i.e., the combined size of the 1st-stage and 2nd-stage reactors) may be reduced to achieve the same level of conversion (as compared to a system using only a 1st-stage reactor).

TABLE 3

Feed flow rate = 150 lb/hr. of aqueous solution containing acetic acid.

| Reactor Temp. (°F.) | Feed Concentration (ppm) | 1st-Stage Reactor (noncatalytic) | | 2nd-Stage Reactor (catalytic) | |
|---|---|---|---|---|---|
| | | Residence Time (sec) | Conversion (%) | Residence Time (sec) | Conversion (%) |
| 790 | 20,300 | 90.4 | 39.5 | 4.5 | 99.4 |
| 760 | 19,500 | 106.6 | 29.0 | 5.3 | 83.5 |
| 730 | 21,400 | 165.5 | 19.2 | 8.3 | 80.9 |

Table 3 shows that acetic acid is relatively difficult to oxidize, as compared to phenol, by exposure to supercritical conditions in the first, thermal reactor. Conversions substantially increased when the feed compounds were first treated in the thermal reactor and then treated in the catalytic reactor.

TABLE 4

Feed flow rate = 100 lb/hr. of waste water containing phenols, n-octonol, and other organic compounds.

| Reactor Temp. (°F.) | TOC in Feed | 1st-Stage Reactor (noncatalytic) | | 2nd-Stage Reactor (catalytic) | |
|---|---|---|---|---|---|
| | | Residence Time (sec) | Conversion (%) | Residence Time (sec) | Conversion (%) |
| 820 | 680 | 119.6 | 92.5 | 6.0 | 97.6 |
| 780 | 680 | 140.8 | 91.3 | 7.0 | 97.8 |
| 760 | 680 | 160.5 | 84.0 | 8.0 | 97.8 |

In Table 4 the term "TOC" means "total organic carbon," which was measured by a TOC Analyzer (Beckman Model 915A). Table 4 shows that reactor temperature for certain systems may be reduced with little or negligible effect on total organic carbon conversion.

In sum, the results depicted in Tables 2–4 show that the conversions were significantly increased using the two stage system of the present invention.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein or in the steps or in the sequence of steps of the methods described herein without departing from the spirit and scope of the invention as described in the following claims. Similarly, isomers and homologs of reactants may be used and still come within the scope of the invention.

What is claimed:

1. A multistage reactor for reacting a feed compound, comprising:
    two reaction zones adapted to contact the feed compound with an oxidant, the first reaction zone being adapted to oxidize compounds during use to form an intermediate product comprising a first intermediate compound which is intermediate the feed compound and an end product, and the second zone being adapted to further oxidize the intermediate product during use so that the first intermediate compound passed through the first zone is reacted to form an end product, or a second intermediate compound which is intermediate the first intermediate compound and an end product; and
    wherein the first zone is substantially non-catalytic and adapted to oxidize compounds at conditions that are supercritical for water and the second zone is adapted to catalytically oxidize compounds during use.

2. The reactor of claim 1, further comprising a conduit connecting the first zone to the second zone.

3. The reactor of claim 1 wherein the intermediate product comprises acetic acid.

4. The reactor of claim 1 wherein the intermediate product comprises ammonia.

5. The reactor of claim 2, further comprising a separator in the conduit to separate solids from liquids.

6. The reactor of claim 1, further comprising an oxidant source to add oxidant in or before either or both of the two zones.

7. The reactor of claim 2, further comprising a recycle conduit to recycle fluid from the conduit to the first zone.

8. The reactor of claim 1, further comprising a recycle conduit to recycle fluid from or after the second zone to the first zone.

9. The reactor of claim 1 wherein the first zone is connected to the second zone such that heat can exchange between the two zones.

10. The reactor of claim 9 wherein the second zone is in coaxial heat exchange relation to the first zone.

11. The reactor of claim 1 wherein both zones are adapted to operate during use at supercritical conditions for water.

12. The reactor of claim 1 wherein the reactor comprises:
an annular flow vessel, and wherein the second zone comprises a central flow chamber in the flow vessel, and the first zone comprises at least one annular flow chamber of the flow vessel, the central and at least one annular flow chamber being in coaxial heat exchange relation, the central flow chamber comprising a catalyst, and at least one annular flow chamber being adapted to react compounds at supercritical conditions for water; and
wherein the flow chamber comprises a fluid passageway interconnecting at least one annular flow chamber and the central flow chamber for flow of fluid between the at least one annular flow chamber and the central flow chamber during use.

13. Apparatus for treating a compound, comprising:
a flow vessel having a central flow chamber and at least one annular flow chamber in coaxial heat exchange relation, and wherein at least one annular flow chamber is operable at supercritical conditions for water during use;
a fluid passageway interconnecting at least one annular flow chamber and the central flow chamber for flow of fluid between the central flow chamber and at least one annular flow chamber during use; and
a catalyst in the central flow chamber.

14. The apparatus of claim 13 wherein the central flow chamber is adapted to operate at supercritical conditions for water.

15. Apparatus for treating waste water, comprising:
a flow vessel having a central flow chamber and at least one annular flow chamber in coaxial heat exchange relation, and wherein the central flow chamber is operable at supercritical conditions for water during use;
a fluid passageway interconnecting at least one annular flow chamber and the central flow chamber for flow of fluid between the central flow chamber and at least one annular flow chamber during use; and
a catalyst in at least one annular flow chamber.

16. The apparatus of claim 15 wherein at least one annular flow chamber is adapted to operate at supercritical conditions for water.

17. A method of treating a feed compound comprising the steps of:
(1) oxidizing a feed compound supercritical and substantially non-catalytic conditions for water to form an intermediate product comprising a first intermediate compound which is intermediate the feed compound and an end product; and
(2) catalytically oxidizing the intermediate product so that the first intermediate compound is oxidized to form an end product or a second intermediate compound intermediate the first intermediate compound and an end product.

18. The method of claim 17 wherein the intermediate product comprises acetic acid.

19. The method of claim 17 wherein the intermediate product comprises ammonia.

20. The method of claim 17, further comprising the step of separating solids from liquids after the feed compound is oxidized.

21. The method of claim 17, further comprising the step of adding an oxidant prior to or during steps (1) or (2).

22. The method of claim 17, further comprising the step of recycling a portion of the intermediate product to mix with the feed compound.

23. The method of claim 17, further comprising the step of recycling a portion of the second intermediate compound to mix with the feed compound.

24. The method of claim 17, further comprising the step of exchanging heat between the feed compound and the intermediate product.

25. The method of claim 17 wherein both steps (1) and (2) are conducted at supercritical conditions for water.

26. The method of claim 17 wherein water is vaporized in both steps (1) and (2).

27. A method of treating a feed compound comprising the steps of:
(1) oxidizing a feed compound by exposure to an oxidant at supercritical conditions for water in a central flow chamber of a flow vessel to form an intermediate product comprising a first intermediate compound which is intermediate the feed compound and an end product; and
(2) catalytically oxidizing the intermediate product in at least one annular flow chamber of the flow vessel so that the first intermediate compound is oxidized to form an end product or a second intermediate compound intermediate the first intermediate compound and an end product;
the central and at least one annular flow chamber being in coaxial heat exchange relation.

28. The method of claim 27 wherein the intermediate product in at least one annular flow chamber with the catalyst is oxidized at supercritical conditions for water.

29. A method of treating a feed compound comprising the steps of:
(1) catalytically oxidizing a feed compound at supercritical conditions for water in a central flow chamber of a flow vessel to form an intermediate product comprising a first intermediate compound which is intermediate the feed compound and an end product;
(2) oxidizing the intermediate product by exposure to supercritical conditions for water in at least one annular flow chamber of the flow vessel so that the first intermediate compound is oxidized to form an end product or a second intermediate compound intermediate the first intermediate compound and an end product;
the central and at least one annular flow chamber being in coaxial heat exchange relation.

30. A method of oxidizing a feed compound, comprising the steps of oxidizing the feed compound to form an intermediate product by exposing it to supercritical conditions for water in a central flow chamber of a flow vessel, and then substantially catalytically oxidizing the intermediate product in at least one annular flow chamber of the flow vessel, the central and at least one annular flow chamber being in coaxial heat exchange relation.

31. The method of claim 30 wherein the intermediate product in at least one annular flow chamber with the catalyst is oxidized at supercritical conditions for water.

32. A method of oxidizing a feed compound, comprising the steps of substantially catalytically oxidizing in a central flow chamber of a flow vessel to form an intermediate product, and then oxidizing the intermediate product by exposing it to supercritical conditions for water in at least one annular flow chamber of the flow vessel, the central and at least one annular flow chamber being in coaxial heat exchange relation.

33. The method of claim 32 wherein the intermediate product in the central flow chamber is oxidized at supercritical conditions for water.

34. The apparatus of any one of claims 13 or 15, wherein the fluid passageway is a conduit connecting the central flow chamber to at least one annular flow chamber.

35. The apparatus of any one of claims 13 or 15, further comprising a separator in the passageway to separate solids from liquids.

36. The apparatus of any one of claims 13 or 15, further comprising an oxidant source to add oxidant in or before either or both the central flow chamber and at least one annular flow chamber.

37. The apparatus of any one of claims 13 or 15, further comprising a recycle conduit to recycle fluid from the passageway to the central flow chamber.

38. The apparatus of any one of claims 13 or 15, further comprising a recycle conduit to recycle fluid from or after at least one annular flow chamber to the central flow chamber.

39. The apparatus of any one of claims 13 or 15 wherein the central flow chamber and at least one annular flow chamber are adapted to operate during use at supercritical conditions for water.

40. The method of any one of claims 27, 29, 30 or 32 wherein the intermediate product comprises acetic acid.

41. The method of any one of claims 27, 29, 30 or 32 wherein the intermediate product comprises ammonia.

42. The method of any one of claims 27, 29, 30 or 32 further comprising the step of separating solids from liquids after the feed compound is oxidized.

43. The method of claim 27 further comprising the step of adding an oxidant prior to or during step (2).

44. The method of claim 29 further comprising the step of adding an oxidant prior to or during steps (1) or (2).

45. The method of any one of claims 27, 29, 30 or 32 further comprising the step of recycling a portion of the intermediate product to mix with the feed compound.

46. The method of any one of claims 27 or 29 further comprising the step of recycling a portion of the second intermediate compound to mix with the feed compound.

47. The method of any one of claims 27 or 29 wherein water is vaporized in both steps (1) and (2).

48. The method of claim 17 wherein the feed compound is oxidized in at least one annular chamber of an annular flow vessel, and the intermediate product is oxidized in a central flow chamber of the annular flow vessel.

* * * * *

UNITED STATES PATENT AND TRADEMARK OFFICE
CERTIFICATE OF CORRECTION

PATENT NO. : 5,358,646

DATED : October 25, 1994

INVENTOR(S) : Gloyna *et al.*

It is certified that error appears in the above-identified patent and that said Letters Patent is hereby corrected as shown below:

```
In claim 17, column 11, line 52, immediately after 'compound',
insert --at--.
```

Signed and Sealed this

Twenty-seventh Day of December, 1994

*Attest:*

BRUCE LEHMAN

*Attesting Officer*  *Commissioner of Patents and Trademarks*